US011855818B1

(12) United States Patent
Sun et al.

(10) Patent No.: US 11,855,818 B1
(45) Date of Patent: Dec. 26, 2023

(54) ADAPTIVE ORTHOGONAL FREQUENCY DIVISION MULTIPLEXING (OFDM) NUMEROLOGY IN A WIRELESS COMMUNICATION NETWORK

(71) Applicant: Marvell Asia Pte Ltd, Singapore (SG)

(72) Inventors: Yakun Sun, Sunnyvale, CA (US); Hongyuan Zhang, Fremont, CA (US); Mingguang Xu, San Jose, CA (US); Hui-Ling Lou, Sunnyvale, CA (US)

(73) Assignee: Marvell Asia Pte Ltd, Singapore (SG)

( * ) Notice: Subject to any disclaimer, the term of this patent is extended or adjusted under 35 U.S.C. 154(b) by 759 days.

(21) Appl. No.: 14/701,208

(22) Filed: Apr. 30, 2015

Related U.S. Application Data

(60) Provisional application No. 61/986,726, filed on Apr. 30, 2014.

(51) Int. Cl.
  *H04L 27/26* (2006.01)
  *H04L 5/00* (2006.01)
  *H04W 84/12* (2009.01)

(52) U.S. Cl.
  CPC ........ *H04L 27/2605* (2013.01); *H04L 5/0007* (2013.01); *H04W 84/12* (2013.01)

(58) Field of Classification Search
  CPC ... H04L 27/2605; H04L 5/0007; H04L 69/22; H04L 1/0009; H04L 27/2607;
  (Continued)

(56) References Cited

U.S. PATENT DOCUMENTS 5,878,057 A  3/1999 Maa
6,167,515 A 12/2000 Lin
(Continued)

FOREIGN PATENT DOCUMENTS

CN 1271477 A 10/2000
CN 1571512 A  1/2005
(Continued)

OTHER PUBLICATIONS

Park, IEEE P802.11 Wireless LANs, Proposed Specification Framework for TGah, IEEE 802.11-11-1137r13, Jan. 2013, pp. 1, 3, 8.*
(Continued)

*Primary Examiner* — Michael Thier
*Assistant Examiner* — Jose L Perez

(57) ABSTRACT

In a method for adapting an orthogonal frequency division multiplexing (OFDM) numerology configuration for use in a communication network one or more OFDM numerology configurations are adaptively selected at a first communication device to be used in communication with one or more second communication devices. Adaptively one or more OFDM numerology configurations includes selecting at least one combination of two or more of (i) a guard interval duration, (ii) a tone spacing, (iii) a starting location of the selected guard interval duration, and (iv) a starting location of the selected tone spacing. A physical layer (PHY) data unit to be transmitted to a second communication device is generated at the first communication device. The PHY data unit is generated using one of the one or more adaptively selected OFDM numerology configurations to generate OFDM symbols of at least a portion of the PHY data unit.

22 Claims, 6 Drawing Sheets

(58) Field of Classification Search
CPC ... H04L 1/1864; H04L 1/0086; H04L 1/1854; H04L 27/2603; H04W 84/12
See application file for complete search history.

(56) References Cited

U.S. PATENT DOCUMENTS

| | | |
|---|---|---|
| 6,192,498 B1 | 2/2001 | Arato |
| 6,226,771 B1 | 5/2001 | Hilla et al. |
| 6,427,219 B1 | 7/2002 | Yang |
| 6,553,534 B2 | 4/2003 | Yonge, III et al. |
| 6,704,364 B1 | 3/2004 | Lim et al. |
| 6,856,590 B2 | 2/2005 | Okada et al. |
| 6,888,844 B2 | 5/2005 | Mallory et al. |
| 6,891,881 B2 | 5/2005 | Trachewsky et al. |
| 6,910,172 B2 | 6/2005 | Hara et al. |
| 6,934,902 B2 | 8/2005 | Hara et al. |
| 7,046,746 B1 | 5/2006 | Keaney et al. |
| 7,080,348 B2 | 7/2006 | Savage |
| 7,145,955 B1 | 12/2006 | Bohnke et al. |
| 7,203,885 B2 | 4/2007 | Gibart |
| 7,257,758 B1 | 8/2007 | Manula et al. |
| 7,336,667 B2 | 2/2008 | Allen, Jr. et al. |
| 7,388,853 B2 | 6/2008 | Ptasinski et al. |
| 7,406,106 B2 | 7/2008 | Mallory |
| 7,453,285 B2 | 11/2008 | Kiel et al. |
| 7,478,314 B1 | 1/2009 | Cheong et al. |
| 7,558,537 B2 | 7/2009 | Trachewsky et al. |
| 7,577,210 B2 | 8/2009 | Lee |
| 7,599,332 B2 | 10/2009 | Zelst et al. |
| 7,626,576 B2 | 12/2009 | Anandakumar et al. |
| 7,733,939 B2 | 6/2010 | Trachewsky |
| 7,742,390 B2 | 6/2010 | Mujtaba |
| 7,773,565 B2 | 8/2010 | Hansen et al. |
| 7,822,005 B2 | 10/2010 | Ptasinski et al. |
| 7,889,707 B2 | 2/2011 | Niu et al. |
| 7,904,519 B2 | 3/2011 | Czotscher et al. |
| 7,920,599 B1 | 4/2011 | Subramanian et al. |
| 7,961,593 B2 | 6/2011 | Porat et al. |
| 7,974,225 B2 | 7/2011 | Kasher |
| 7,987,405 B2 | 7/2011 | Turner et al. |
| 8,010,865 B2 | 8/2011 | Gu et al. |
| 8,046,663 B2 | 10/2011 | Yoon |
| 8,111,704 B2 | 2/2012 | Singhal et al. |
| 8,144,647 B2 | 3/2012 | Nabar et al. |
| 8,155,138 B2 | 4/2012 | van Nee |
| 8,179,897 B2 | 5/2012 | Allen, Jr. et al. |
| 8,201,065 B1 | 6/2012 | Cheong et al. |
| 8,218,554 B2 | 7/2012 | Allen, Jr. et al. |
| 8,223,072 B2 | 7/2012 | Ponnuswamy |
| 8,225,187 B1 | 7/2012 | Schultz et al. |
| 8,234,551 B2 | 7/2012 | Shen et al. |
| 8,245,108 B2 | 8/2012 | Yoon |
| 8,264,977 B2 | 9/2012 | Sanguineti et al. |
| 8,289,869 B2 | 10/2012 | Sawai |
| 8,310,981 B2 | 11/2012 | Damnjanovic et al. |
| 8,331,419 B2 | 12/2012 | Zhang et al. |
| 8,332,719 B2 | 12/2012 | You et al. |
| 8,339,978 B2 | 12/2012 | Sawai et al. |
| 8,369,301 B2 | 2/2013 | Cai |
| 8,397,126 B2 | 3/2013 | Xu et al. |
| 8,418,024 B2 | 4/2013 | You et al. |
| 8,462,863 B1 | 6/2013 | Zhang et al. |
| 8,494,089 B2 | 7/2013 | Aoki et al. |
| 8,498,362 B2 | 7/2013 | Zhang et al. |
| 8,509,051 B2 | 8/2013 | Ling et al. |
| 8,526,351 B2 | 9/2013 | Fischer et al. |
| 8,527,853 B2 | 9/2013 | Lakkis |
| 8,532,077 B2 | 9/2013 | Stacey et al. |
| 8,539,287 B2 | 9/2013 | Lee et al. |
| 8,542,589 B2 | 9/2013 | Surineni et al. |
| 8,543,884 B2 | 9/2013 | Mansour |
| 8,599,804 B2 | 12/2013 | Erceg et al. |
| 8,619,907 B2 | 12/2013 | Mujtaba et al. |
| 8,627,171 B2 | 1/2014 | Pi |
| 8,681,757 B2 | 3/2014 | Lee et al. |
| 8,718,021 B2 | 5/2014 | Yu et al. |
| 8,724,720 B2 | 5/2014 | Srinivasa et al. |
| 8,737,189 B2 | 5/2014 | Hansen et al. |
| 8,867,653 B2 | 10/2014 | Zhang et al. |
| 8,873,680 B2 | 10/2014 | Zhang |
| 8,885,740 B2 | 11/2014 | Zhang et al. |
| 8,948,283 B2 | 2/2015 | Zhang |
| 8,953,696 B2 | 2/2015 | Stoye |
| 8,982,889 B2 | 3/2015 | Zhang |
| 9,130,727 B2 | 9/2015 | Zhang et al. |
| 9,131,528 B2 | 9/2015 | Zhang et al. |
| 9,178,745 B2 | 11/2015 | Zhang et al. |
| 9,184,794 B1 | 11/2015 | Ibrahim et al. |
| 9,184,967 B1 | 11/2015 | Ibrahim et al. |
| 9,209,837 B1 | 12/2015 | Cheong et al. |
| 9,232,435 B2 | 1/2016 | Schliwa-Bertling et al. |
| 9,258,829 B1 | 2/2016 | Ibrahim et al. |
| 9,294,164 B2 | 3/2016 | Zhang et al. |
| 9,294,323 B2 | 3/2016 | Zhang |
| 9,397,785 B1 | 7/2016 | Zhang et al. |
| 9,414,432 B2 | 8/2016 | Zhang |
| 9,712,358 B2 | 7/2017 | Zhang et al. |
| 2003/0012160 A1 | 1/2003 | Webster et al. |
| 2003/0031151 A1 | 2/2003 | Sharma et al. |
| 2003/0056043 A1 | 3/2003 | Kostadinov |
| 2003/0142626 A1 | 7/2003 | Umayabashi et al. |
| 2004/0081131 A1 | 4/2004 | Walton et al. |
| 2005/0169261 A1 | 8/2005 | Williams et al. |
| 2005/0237918 A1* | 10/2005 | Asai ............... H04L 27/26025 370/203 |
| 2005/0243774 A1 | 11/2005 | Choi et al. |
| 2006/0116091 A1* | 6/2006 | Hammes ............ H04L 12/16 455/132 |
| 2006/0176966 A1 | 8/2006 | Stewart et al. |
| 2006/0250940 A1* | 11/2006 | Tirkkonen ........ H04L 27/2607 370/208 |
| 2007/0002878 A1 | 1/2007 | Moorti et al. |
| 2007/0014375 A1 | 1/2007 | Nakao |
| 2007/0047666 A1 | 3/2007 | Trachewsky |
| 2007/0147226 A1* | 6/2007 | Khandekar ........ H04L 5/0044 370/208 |
| 2007/0153760 A1 | 7/2007 | Shapira |
| 2007/0153830 A1 | 7/2007 | Xhafa et al. |
| 2007/0159957 A1* | 7/2007 | Ljung ............... H04L 27/2646 370/208 |
| 2007/0183307 A1* | 8/2007 | Akita ................ H04J 11/0073 370/208 |
| 2007/0183523 A1 | 8/2007 | Koo et al. |
| 2007/0204052 A1* | 8/2007 | Trainin ............. H04W 56/0045 709/230 |
| 2007/0268812 A1* | 11/2007 | Yoon ................. H04L 1/0006 370/203 |
| 2008/0056393 A1 | 3/2008 | Niu et al. |
| 2008/0298435 A1 | 12/2008 | Lakkis |
| 2008/0299962 A1 | 12/2008 | Kasher |
| 2009/0004971 A1* | 1/2009 | Dateki ............... H04L 27/2607 455/62 |
| 2009/0034635 A1 | 2/2009 | Von Elbwart et al. |
| 2009/0103485 A1 | 4/2009 | Singh et al. |
| 2009/0103649 A1* | 4/2009 | Vare ................. H04L 5/0064 375/295 |
| 2009/0185632 A1* | 7/2009 | Cai ................... H04L 5/0044 375/260 |
| 2009/0196163 A1 | 8/2009 | Du |
| 2009/0285321 A1* | 11/2009 | Schulz .............. H04L 27/2607 375/267 |
| 2010/0046358 A1 | 2/2010 | van Nee |
| 2010/0046542 A1 | 2/2010 | van Zelst et al. |
| 2010/0046656 A1 | 2/2010 | van Nee et al. |
| 2010/0074277 A1 | 3/2010 | Nishibayashi et al. |
| 2010/0091675 A1 | 4/2010 | Sawai |
| 2010/0202301 A1 | 8/2010 | Wen et al. |
| 2010/0232542 A1 | 9/2010 | Miyoshi et al. |
| 2010/0260159 A1 | 10/2010 | Zhang et al. |
| 2010/0309834 A1 | 12/2010 | Fischer et al. |
| 2010/0309848 A1 | 12/2010 | Erceg et al. |
| 2010/0310002 A1 | 12/2010 | Lauer et al. |
| 2011/0002219 A1 | 1/2011 | Kim et al. |

(56) References Cited

U.S. PATENT DOCUMENTS

| | | |
|---|---|---|
| 2011/0026639 A1 | 2/2011 | Rouquette-Leveil et al. |
| 2011/0092231 A1 | 4/2011 | Yoo et al. |
| 2011/0103366 A1* | 5/2011 | Morimoto ............ H04L 5/0064 |
| | | 370/344 |
| 2011/0110348 A1 | 5/2011 | Lee et al. |
| 2011/0134899 A1 | 6/2011 | Jones, IV et al. |
| 2011/0142020 A1 | 6/2011 | Kang et al. |
| 2011/0149927 A1 | 6/2011 | Stacey et al. |
| 2011/0194655 A1 | 8/2011 | Sampath et al. |
| 2011/0222490 A1 | 9/2011 | Fischer et al. |
| 2011/0255620 A1 | 10/2011 | Jones, IV et al. |
| 2011/0271169 A1 | 11/2011 | Pi |
| 2011/0280182 A1 | 11/2011 | Kim et al. |
| 2011/0299382 A1 | 12/2011 | Van Nee et al. |
| 2011/0305286 A1* | 12/2011 | Shimezawa ......... H04L 27/2688 |
| | | 375/260 |
| 2011/0305296 A1 | 12/2011 | Van Nee |
| 2012/0039292 A1 | 2/2012 | Lee et al. |
| 2012/0039406 A1 | 2/2012 | Srinivasa et al. |
| 2012/0054587 A1 | 3/2012 | Van Nee et al. |
| 2012/0069746 A1 | 3/2012 | Park |
| 2012/0122495 A1 | 5/2012 | Weng et al. |
| 2012/0155447 A1 | 6/2012 | Vermani et al. |
| 2012/0170563 A1 | 7/2012 | Abraham et al. |
| 2012/0195391 A1 | 8/2012 | Zhang et al. |
| 2012/0201316 A1 | 8/2012 | Zhang et al. |
| 2012/0294268 A1 | 11/2012 | Lee et al. |
| 2012/0294294 A1 | 11/2012 | Zhang |
| 2012/0294392 A1 | 11/2012 | Zhang |
| 2012/0300874 A1 | 11/2012 | Zhang |
| 2012/0327871 A1* | 12/2012 | Ghosh .................. H04L 5/0023 |
| | | 370/329 |
| 2013/0039313 A1 | 2/2013 | Hansen et al. |
| 2013/0070869 A1 | 3/2013 | Motamed et al. |
| 2013/0121244 A1 | 5/2013 | Vermani et al. |
| 2013/0121348 A1 | 5/2013 | Zhang et al. |
| 2013/0122822 A1 | 5/2013 | Srinivasan et al. |
| 2013/0128807 A1 | 5/2013 | Vermani et al. |
| 2013/0202001 A1 | 8/2013 | Zhang |
| 2013/0216002 A1 | 8/2013 | Suh et al. |
| 2013/0259017 A1 | 10/2013 | Zhang et al. |
| 2013/0294317 A1 | 11/2013 | Malladi et al. |
| 2014/0029681 A1 | 1/2014 | Zhang et al. |
| 2014/0064194 A1 | 3/2014 | Schliwa-Bertling et al. |
| 2014/0112168 A1 | 4/2014 | Chen et al. |
| 2014/0185662 A1 | 7/2014 | Azizi et al. |
| 2014/0185695 A1 | 7/2014 | Kenney et al. |
| 2014/0211775 A1 | 7/2014 | Sampath et al. |
| 2014/0269770 A1 | 9/2014 | Kenney et al. |
| 2014/0307612 A1* | 10/2014 | Vermani ............... H04L 5/0044 |
| | | 370/312 |
| 2014/0314064 A1* | 10/2014 | Park ...................... H04W 84/12 |
| | | 370/338 |
| 2014/0328435 A1* | 11/2014 | You ...................... H04L 1/0071 |
| | | 375/308 |
| 2014/0337690 A1 | 11/2014 | Zhang |
| 2014/0348047 A1* | 11/2014 | Park .................. H04W 52/0216 |
| | | 370/311 |
| 2014/0355626 A1* | 12/2014 | Fechtel ............... H04L 27/2605 |
| | | 370/474 |
| 2014/0362935 A1 | 12/2014 | Porat et al. |
| 2015/0009894 A1* | 1/2015 | Vermani ............. H04L 27/2602 |
| | | 370/328 |
| 2015/0009978 A1* | 1/2015 | Choi ................. H04L 25/03866 |
| | | 370/338 |
| 2015/0030101 A1 | 1/2015 | Zhang et al. |
| 2015/0071372 A1 | 3/2015 | Zhang |
| 2015/0117227 A1 | 4/2015 | Zhang et al. |
| 2015/0117363 A1* | 4/2015 | Rong .................... H04B 7/0452 |
| | | 370/329 |
| 2015/0117433 A1 | 4/2015 | Zhang et al. |
| 2015/0180622 A1* | 6/2015 | Yoo ......................... H04L 5/001 |
| | | 370/330 |
| 2015/0207521 A1 | 7/2015 | Waters |
| 2015/0256308 A1* | 9/2015 | Ma ........................ H04L 5/0035 |
| | | 370/330 |
| 2015/0264161 A1* | 9/2015 | Tian ...................... H04L 1/1854 |
| | | 370/338 |
| 2015/0295676 A1 | 10/2015 | Kenney et al. |
| 2015/0381311 A1 | 12/2015 | Zhang et al. |
| 2015/0381394 A1 | 12/2015 | Zhang et al. |
| 2016/0050097 A1* | 2/2016 | Atungsiri ............... H04L 5/0007 |
| | | 375/295 |
| 2016/0072654 A1* | 3/2016 | Choi ..................... H04L 5/0007 |
| | | 370/329 |
| 2016/0156750 A1 | 6/2016 | Zhang et al. |
| 2016/0204968 A1 | 7/2016 | Zhang |
| 2016/0212001 A1* | 7/2016 | Azizi .................. H04L 27/2613 |
| 2016/0234779 A1* | 8/2016 | Kenney .................. H04L 69/22 |
| 2016/0241366 A1* | 8/2016 | Azizi ..................... H04W 74/04 |
| 2016/0353370 A1* | 12/2016 | Choi ..................... H04W 48/20 |
| 2017/0027001 A1* | 1/2017 | Choi ..................... H04W 52/30 |
| 2017/0033960 A1* | 2/2017 | Choi ...................... H04L 5/0005 |
| 2017/0310514 A1 | 10/2017 | Zhang et al. |
| 2017/0310515 A1 | 10/2017 | Zhang et al. |
| 2017/0324598 A1* | 11/2017 | Suh ..................... H04L 27/2604 |
| 2018/0048740 A1 | 2/2018 | Zhang et al. |

FOREIGN PATENT DOCUMENTS

| | | |
|---|---|---|
| CN | 1989748 A | 6/2007 |
| CN | 101282194 A | 10/2008 |
| CN | 101321034 A | 12/2008 |
| CN | 101562502 A | 10/2009 |
| CN | 103081427 A | 5/2013 |
| EP | 1968225 | 9/2008 |
| JP | 2005-304063 A | 10/2005 |
| JP | 2007-506359 A | 3/2007 |
| JP | 2013-543672 A | 12/2013 |
| JP | 2013-543677 A | 12/2013 |
| WO | WO-03005652 | 1/2003 |
| WO | WO-2006/025996 A2 | 3/2006 |
| WO | WO-2007/074777 | 7/2007 |
| WO | WO-2008/046163 | 4/2008 |
| WO | WO-2009052420 A2 | 4/2009 |
| WO | WO-2009/059229 | 5/2009 |
| WO | WO-2009/084926 | 7/2009 |
| WO | WO-2009/114612 | 9/2009 |
| WO | WO-2010/120692 | 10/2010 |
| WO | WO-2011/087560 A2 | 7/2011 |
| WO | WO-2012/039640 | 3/2012 |
| WO | WO-2012/040396 | 3/2012 |
| WO | WO-2012/106635 | 8/2012 |
| WO | WO-2012/122119 | 9/2012 |
| WO | WO-2012/122119 A1 | 9/2012 |
| WO | WO-2013/152111 | 10/2013 |
| WO | WO-2014/183059 | 11/2014 |

OTHER PUBLICATIONS

Choi et al., U.S. Appl. No. 61/820,185, filed May 7, 2013, whole document (Year: 2013).*

Wikipedia entry for Guard interval, Apr. 7, 2014, whole document (Year: 2014).*

Choi et al., Wirelesslan Preamble Design for Backward Compatibility (U.S. Appl. No. 61/935,805), filed Feb. 4, 2014, USPTO, whole document (Year: 2014).*

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHZ," *The*

(56) References Cited

OTHER PUBLICATIONS

Institute of Electrical and Electronics Engineers, Inc., pp. 1-446 (Jul. 2013).
IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, pp. 1-123 (Nov. 2011).
Lee et al., "TGaf PHY proposal," *The Institute of Electrical and Electronics Engineers*, doc. No. IEEE 802.11-12/0809r5, pp. 1-43, Jul. 10, 2012.
De Vegt, "Potential Compromise for 802.11ah Use Case Document", Institute of Electrical and Electronics Engineers, doc. No. IEEE 802.11-11/0457r0, pp. 1-27 (Mar. 2011).
Park, "Proposed Specification Framework for TGah", *The Institute of Electrical and Electronics Engineers*, doc. No. IEEE 802.11-11/1137r6, pp. 1-13 (Mar. 2012).
Park, "Proposed Specification Framework for TGah D9.x", *The Institute of Electrical and Electronics Engineers*, doc. No. IEEE 802.11-yy/xxxxr0, pp. 1-30 (Jul. 2012).
Park, "Proposed Specification Framework for TGah", *The Institute of Electrical and Electronics Engineers*, doc. No. IEEE 802.11-11/1137r11, pp. 1-36 (Sep. 2012).
Park, "Specification Framework for TGah," *The Institute of Electrical and Electronics Engineers*, doc. No. IEEE 802.11-11/1137r13, pp. 1-58 (Jan. 14, 2013).
Shao, "Channel Selection for 802.11ah," doc.: IEEE 802.11-12/0816r0, pp. 1-11 (Jul. 2012).
Taghavi et al., "Introductory Submission for TGah", doc. No. IEEE 802.11-11/0062r0, *Institute for Electrical and Electronics Engineers*, pp. 1-5 (Jan. 14, 2011).
Vermani et al. "Preamble Format for 1 MHz," *The Institute of Electrical and Electronics Engineers*, doc. No. IEEE 802.11-11/1482r2, pp. 1-30 (Nov. 2011).
Vermani et al. "Spec Framework Text for PHY Numerology," *The Institute of Electrical and Electronics Engineers*, doc. No. IEEE 802.11-11/1311r0, pp. 1-5 (Sep. 2011).
Yu et al., "Coverage extension for IEEE802.11ah," *The Institute of Electrical and Electronics Engineers*, doc. No. IEEE 802.11-11/0035r1, pp. 1-10 (Jan. 2011).
Zhang et al., "11ah Data Transmission Flow," *The Institute of Electrical and Electronics Engineers*, doc. No. IEEE 802.11-11/1484r1, pp. 1-15 (Nov. 2011).
Zhang et al., "1MHz Waveform in Wider BW ", *The Institute of Electrical and Electronics Engineers*, doc. No. IEEE 802.11-12/0309r1, pp. 1-10 (Mar. 2012).
Zhang et al., "Beamforming Feedback for Single Stream," *The Institute of Electrical and Electronics Engineers*, doc. No. IEEE 802.11-12/1312r0, pp. 1-22 (Nov. 12, 2012).
IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHZ," *The Institute of Electrical and Electronics Engineers, Inc.*, pp. 1-456 (Sep. 2013).
Chen, "Home Network Basis: Transmission Environments and Wired/Wireless Protocols," *Prentice Hall*, pp. 1-26 (Jul. 2003).
Hiertz et al., "The IEEE 802.11 Universe," *IEEE Communications Magazine*, pp. 62-70, (Jan. 2010).
Mujtaba, "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).
Perahia, et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).
Stacey et al., "Specification Framework for TGac," document No. IEEE 802.11-09/0992r20, *Institute for Electrical and Electronics Engineers*, pp. 1-49, (Jan. 18, 2011).
Van Nee et al. "The 802.11n MIMO-OFDM Standard for Wireless LAN and Beyond," Wireless Personal Communications, vol. 37, pp. 445-453 (Jun. 2006).
Invitation to Pay Fees and Partial International Search Report for International Application No. PCT/US2014/054991, dated Mar. 17, 2015 (6 pages).
"IEEE P802.11n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.
Chun et al., "Legacy Support on HEW frame structure," doc: IEEE 11-13/1057r0, *The Institute of Electrical and Electronics Engineers, Inc.*, pp. 1-8 (Sep. 2013).
Francis, Michael, "Viterbi Decoder Block Decoding—Trellis Termination and Tail Biting," Xilinx XAPP551 v2.0, pp. 1-21 (Jul. 30, 2010).
Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).
Harada, "Project: IEEE P802.15 Working Group for Wireless Personal Area Network (WPANs)," IEEE 802.15-07-0693-003c (May 2007).
IEEE P802.15.4m/D3, May 2013 IEEE Standard for Local metropolitan area networks—"Part 15.4: Low Rate Wireless Personal Area Networks (LR-WPANs)", Amendment 6: TV White Space Between 54 MHz and 862 MHz Physical Layer, Excerpt, 2 pages (May 2013).
IEEE Std 802.11ad™/D9.0 "Draft Standard for Information technology—Telecommunications and information Exchange Between Systems—Local and Metropolitan Area Networks—Specific Requirements" Part 11: Wireless LAN Medium Access Control (MAC) and Physical Layer (PHY) Specifications, Amendment 3: Enhancements for Very High Throughput in the 60 GHz Band *The Institute of Electrical and Electronics Engineers, Inc.*, (Jul. 2012).
IEEE Std P802.11 ad/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 3: Enhancements for Very High Throughput in the 60 GHz Band," *The Institute of Electrical and Electronics Engineers, Inc.*, Sep. 2011.
Imashioya et al., "RTL Design of 1.2 Gbps MIMO WLAN System and Its Business Aspect," IEEE 9th Int'l Symposium on Communications and Information Technology (ISCIT 2009), *The Institute of Electrical and Electronics Engineers*, pp. 296-301 (2009).
Park, "Proposed Specification Framework for TGah", *The Institute of Electrical and Electronics Engineers*, doc. No. IEEE 802.11-yy/xxxxr05, (Jan. 2012).
Seok et al., "HEW PPDU Format for Supporting MIMO-OFDMA," IEEE 802.11-14/1210r0, 16 pages, (Sep. 14, 2014).
Shi et al., "Phase Tracking During VHT-LTF," Doc. No. IEEE 802.11-10/0771r0, *The Institute of Electrical and Electronics Engineers, Inc.*, pp. 1-19 (Jul. 2010).
Syafei et al., "A Design of Next Generation Gigabit MIMO Wireless LAN System ," IEEE 12th Int'l Conference on Advanced Communication Technology (ICACT 2010), *The Institute of Electrical and Electronics Engineers*, pp. 941-946 (2010).
Syafei et al., "A Gigabit MIMO WLAN System with International Standardization Strategy," IEEE Int'l Symposium on Intelligent Signal Processing and Communication Systems (ISPACS 2009), *The Institute of Electrical and Electronics Engineers*, pp. 228-231 (2009).

(56) References Cited

OTHER PUBLICATIONS

Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), *The Institute of Electrical and Electronics Engineers*, pp. 207-211 (2009).

Van Zelst et al., "Pilot Sequence for VHT-DATA," Doc. No. IEEE 802.11-10/0811r1, *The Institute of Electrical and Electronics Engineers, Inc.*, pp. 1-10 (Jul. 2010).

Zhang Zhao-Yang: "A Novel AFDM Transmission Scheme with Length-Adaptive Cyclic Prefix," Journal of Zhejiang University. Science, Zhejiant University Press, Hangzhou, CN vol. 5, No. 11, Jul. 7, 2003, pp. 1336-1342.

IEEE P802.11ah™/D1.3 "Draft Standard for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," The Institute of Electrical and Electronics Engineers, Inc., pp. 1-466 (Apr. 2014).

\* cited by examiner

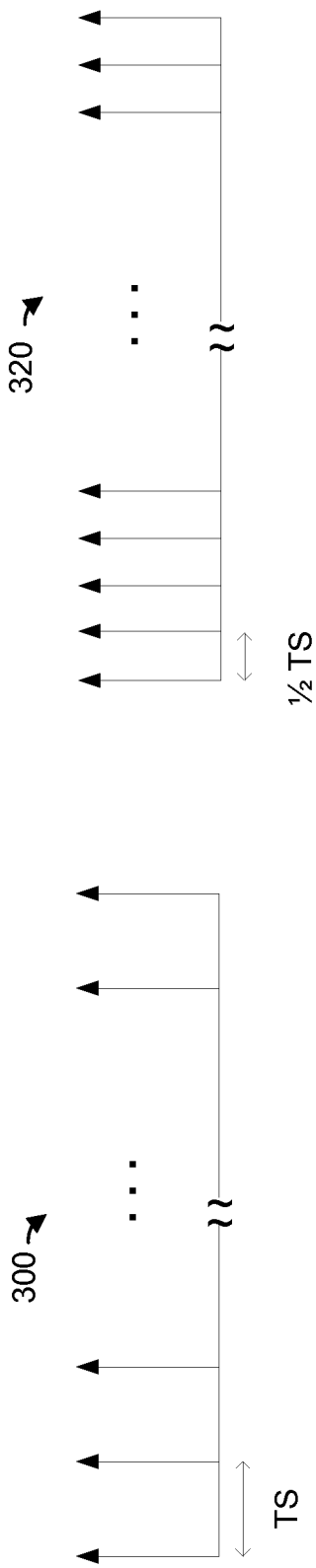
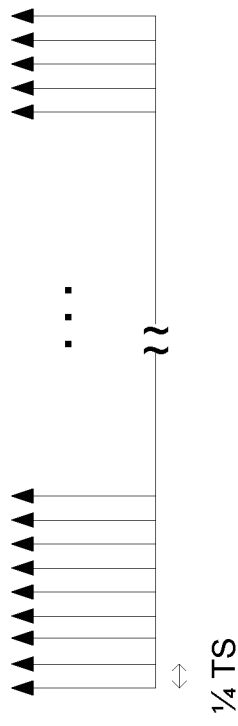
FIG. 3A
FIG. 3B
FIG. 3C

ADAPTIVE ORTHOGONAL FREQUENCY DIVISION MULTIPLEXING (OFDM) NUMEROLOGY IN A WIRELESS COMMUNICATION NETWORK

CROSS-REFERENCES TO RELATED APPLICATIONS

This disclosure claims the benefit of U.S. Provisional Patent Application No. 61/986,726, entitled "Adaptive OFDM Numerology for High Efficiency WiFi" and filed on Apr. 30, 2014, the disclosure of which is incorporated herein by reference in its entirety.

FIELD OF THE DISCLOSURE

The present disclosure relates generally to communication networks and, more particularly, to wireless local area networks that utilize orthogonal frequency division multiplexing (OFDM).

BACKGROUND

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method for adapting an orthogonal frequency division multiplexing (OFDM) numerology configuration for use in a communication network includes adaptively selecting, at a first communication device, one or more OFDM numerology configurations to be used in communication with one or more second communication devices, including adaptively selecting at least one combination of two or more of (i) a guard interval duration, (ii) a tone spacing, (iii) a starting location of the selected guard interval duration, and (iv) a starting location of the selected tone spacing. The method also includes generating, at the first communication device, a physical layer (PHY) data unit to be transmitted to a second communication device of the one or more second communication devices, including using one of the one or more adaptively selected OFDM numerology configurations to generate OFDM symbols of at least a portion of the PHY data unit.

In another embodiment, a first communication device comprises a network interface configured to adaptively select one or more OFDM numerology configurations to be used in communication with one or more second communication devices, including adaptively select at least one combination of two or more of (i) a guard interval duration, (ii) a tone spacing, (iii) a starting location of the selected guard interval duration, and (iv) a starting location of the selected tone spacing. The network interface is also configured to generate a physical layer (PHY) data unit to be transmitted to a second communication device of the one or more second communication devices, including using one of the one or more adaptively selected OFDM numerology configurations to generate OFDM symbols of at least a portion of the PHY data unit.

BRIEF DESCRIPTION OF THE DRAWINGS

FIGS. 3A-3C are diagrams illustrating OFDM tone spacing used with OFDM symbols of a data unit, according to several embodiments;

DETAILED DESCRIPTION

In embodiments described below, a wireless network device such as an access point (AP) of a wireless local area network (WLAN) transmits data streams to one or more client stations. The AP is configured to operate with client stations according to at least a first communication protocol. The first communication protocol is sometimes referred to herein as "high efficiency Wi-Fi," "HEW" communication protocol, or 802.11ax communication protocol. In some embodiments, different client stations in the vicinity of the AP are configured to operate according to one or more other communication protocols which define operation in the same frequency band as the HEW communication protocol but with generally lower data throughputs. The lower data throughput communication protocols (e.g., IEEE 802.11a, IEEE 802.11n, and/or IEEE 802.11ac) are collectively referred herein as "legacy" communication protocols. In at least some embodiments, the legacy communication protocols are generally deployed in indoor communication channels, and the HEW communication protocol is at least sometimes deployed for outdoor communications, extended range communications, or communications in areas with reduced signal-to-noise ratios (SNR) of transmitted signals.

In an embodiment, a first communication device (e.g., an AP) adaptively selects an orthogonal frequency division multiplexing (OFDM) numerology configuration to be used in communicating with one or more second communication devices (e.g., one or more client stations) over an OFDM communication channel. In various embodiment, the first communication device adaptively selects the OFDM numerology configuration based on one or more factors such as specifics of the communication channel (e.g., whether the communication channel is an indoor communication channel or an outdoor communication channel), the maximum expected Doppler shift expected in the communication channel, capabilities of the one or more second communication devices, etc. Selecting OFDM numerology configuration involves selecting one or more of, or a combination of two or more of (i) a guard interval duration to be used with OFDM symbols of at least a portion of a data unit, (ii) a tone spacing to be used with OFDM symbols of at least a portion of a data unit, (iii) a starting location of the selected guard interval duration within the data unit, and (iv) a starting location of the selected tone spacing within the data unit, in various embodiments. Generally speaking, adaptively selecting an appropriate OFDM numerology configuration, e.g. for a particular communication channel or for particular equipment being utilized in communicating over the communication channel, improves throughput and/or quality of communication over the communication channel, as will be explained in more detail below, in at least some embodiments and/or scenarios.

Figure 1:
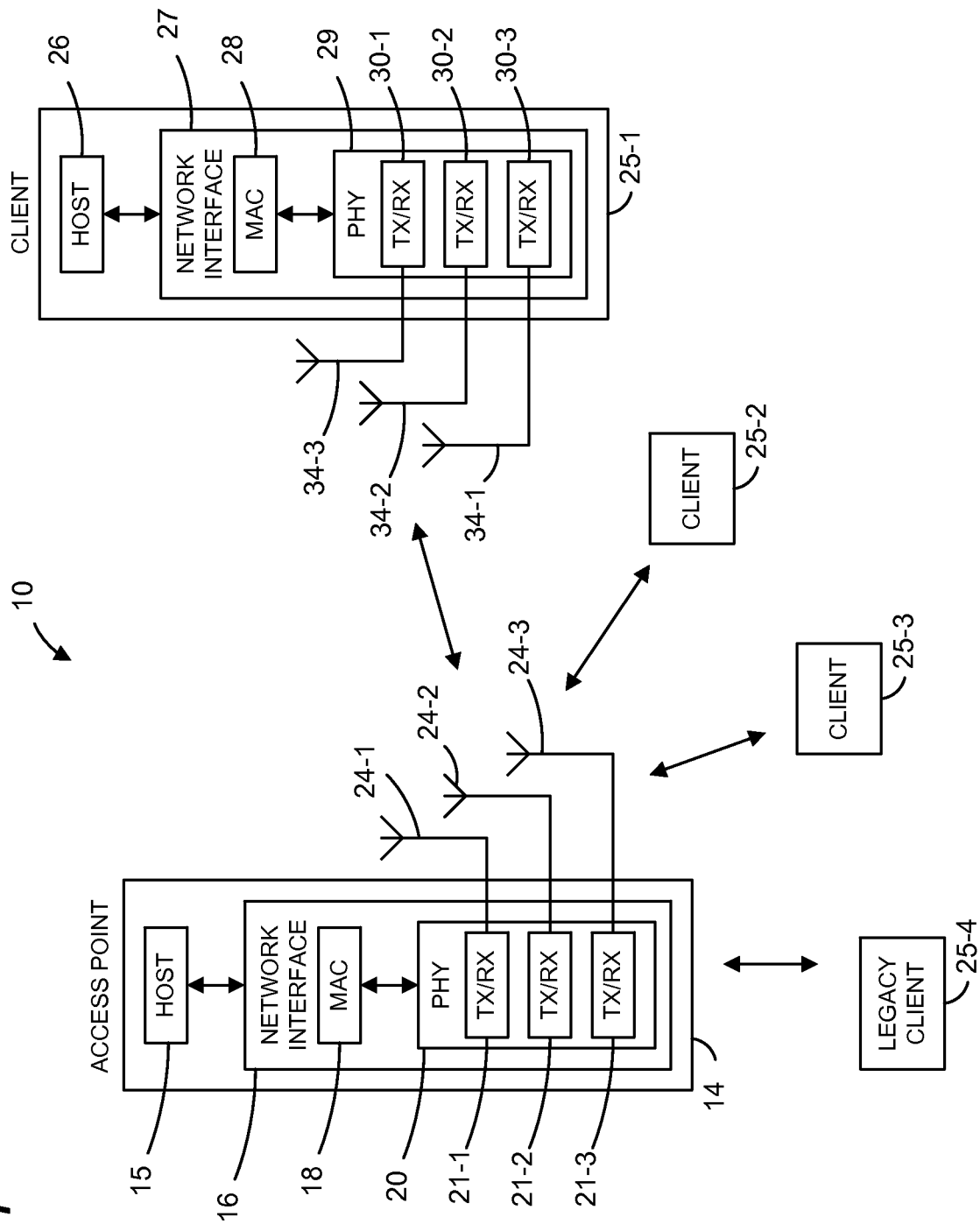
FIG. 1 is a block diagram of an example wireless local area network (WLAN), according to an embodiment.

FIG. 1 is a block diagram of an example wireless local area network (WLAN) 10 which implements adaptive OFDM numerology techniques, according to an embodiment. An AP 14 includes a host processor 15 coupled to a network interface device 16. The network interface device 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In one embodiment, the MAC processing unit 18 and the PHY processing unit 20 are configured to operate according to a first communication protocol (e.g., HEW communication protocol). In another embodiment, the MAC processing unit 18 and the PHY processing unit 20 are also configured to operate according to a second communication protocol (e.g., IEEE 802.11ac Standard). In yet another embodiment, the MAC processing unit 18 and the PHY processing unit 20 are additionally configured to operate according to the second communication protocol, a third communication protocol and/or a fourth communication protocol (e.g., the IEEE 802.11a Standard and/or the IEEE 802.11n Standard).

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 is not configured to operate according to the first communication protocol but is configured to operate according to at least one of the second communication protocol, the third communication protocol and/or the fourth communication protocol (referred to herein as a "legacy client station").

The client station 25-1 includes a host processor 26 coupled to a network interface device 27. The network interface device 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to the second communication protocol, the third communication protocol and/or the fourth communication protocol.

In an embodiment, one or both of the client stations 25-2 and 25-3, has a structure the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

In various embodiments, the PHY processing unit 20 of the AP 14 is configured to generate data units conforming to the first communication protocol and having formats described herein. The transceiver(s) 21 is/are configured to transmit the generated data units via the antenna(s) 24. Similarly, the transceiver(s) 24 is/are configured to receive the data units via the antenna(s) 24. The PHY processing unit 20 of the AP 14 is configured to process received data units conforming to the first communication protocol and having formats described hereinafter and to determine that such data units conform to the first communication protocol, according to various embodiments.

In various embodiments, the PHY processing unit 29 of the client device 25-1 is configured to generate data units conforming to the first communication protocol and having formats described herein. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is configured to process received data units conforming to the first communication protocol and having formats described hereinafter and to determine that such data units conform to the first communication protocol, according to various embodiments.

Figure 2:
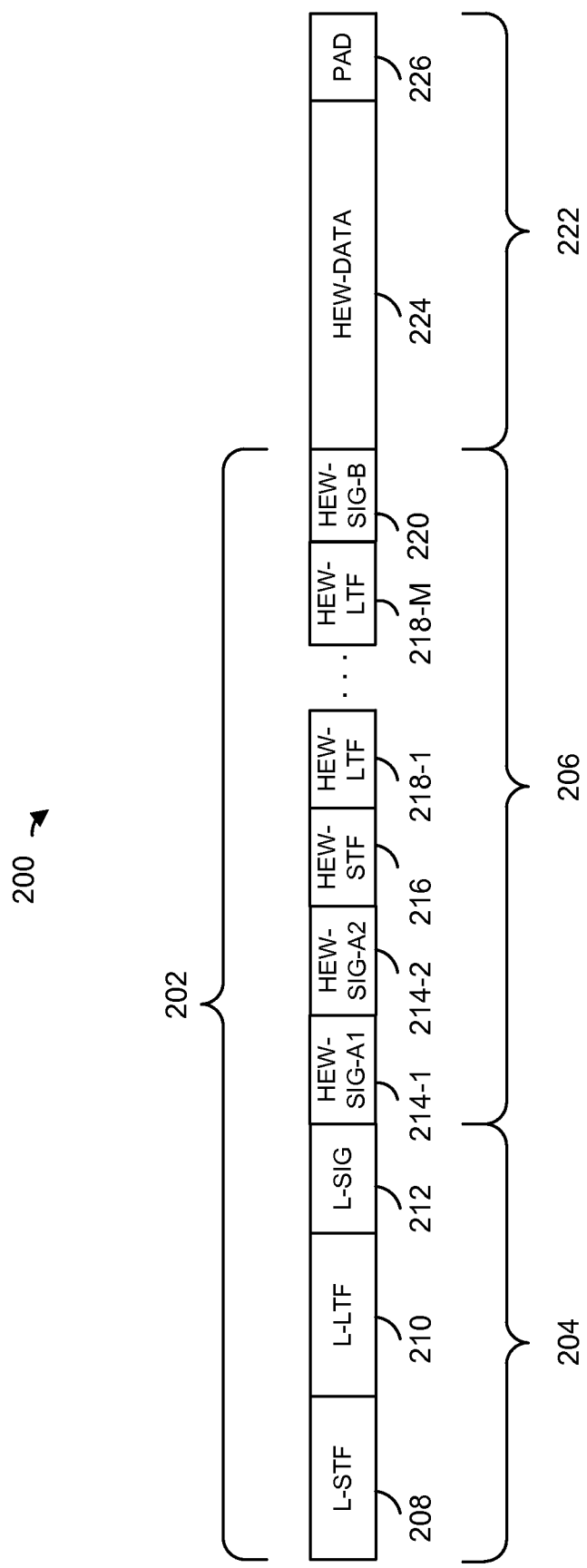
FIG. 2 is a diagram of an OFDM data unit, according to an embodiment.

FIG. 2 is a diagram of an OFDM data unit 200 that the AP 14 is configured to transmit to a client station (e.g., the client stations 25-1) via orthogonal frequency domain multiplexing (OFDM) modulation, according to an embodiment. In an embodiment, the client station 25-1 is also configured to transmit the data unit 200 to the AP 14. The data unit 200 conforms to the HEW communication protocol and occupies a 20 MHz bandwidth. Data units similar to the data unit 200 occupy other suitable bandwidth such as 40 MHz, 80 MHz, 160 MHz, 320 MHz, 640 MHz, for example, or other suitable bandwidths, in other embodiments. The data unit 200 is suitable for "mixed mode" situations, i.e., when the WLAN 10 includes a client station (e.g., the legacy client station 24-4) that conforms to a legacy communication protocol, but not the first communication protocol. The data unit 200 is utilized in other situations as well, in some embodiments.

The data unit 200 includes a preamble 202, which, in turn, includes a legacy preamble portion 204 and a high efficiency WLAN (HEW) preamble portion 206. The legacy preamble portion 202 includes an L-STF 208, an L-LTF 210, and an L-SIG 212. The HEW preamble portion 706 includes two first HEW signal fields (HEW-SIGAs) 214 including a first HEW signal field (HEW-SIGA1) 214-1 and a second HEW signal field (HEW-SIGA2) 214-2, an HEW short training field (HEW-STF) 216, M HEW long training fields (HEW-LTFs) 218, where M is an integer, and a third HEW signal field (HEW-SIGB) 220. Each of the L-STF 208, the L-LTF 210, the L-SIG 212, the HEW-SIGAs 215, the HEW-STF 216, the M HEW-LTFs 218, and the HEW-SIGB 220 comprises an integer number of one or more OFDM symbols. For example, in an embodiment, the HEW-SIGAs 214 comprise two OFDM symbols, where the HEW-SIGA1 214-1 field comprises the first OFDM symbol and the HEW-SIGA2 214-2 comprises the second OFDM symbol, in an embodiment. In at least some examples, the HEW-SIGAs 214 are collectively referred to as a single HEW signal field (HEW-SIGA) 214. The L-SIG 212, the HEW-SIGAs 214 and the HEW-SIGB 220 generally carry formatting information for the data unit 200, in an embodiment.

In some embodiments, the data unit 200 also includes a data portion 222. In some embodiments, the data portion 222 includes OFDM data symbols 224 and one or more padding OFDM symbols 226. The OFDM padding symbols 226 correspond to one or more last OFDM symbols of the data portion 222, in an embodiment. In an embodiment, a padding OFDM symbol includes at least some padding bits added at the end of the data portion 226. The data unit 200 omits the padding OFDM symbols 226, or omits the entire data portion 222, in some embodiments.

In the embodiment of FIG. 2, the data unit 200 includes one of each of the L-STF 208, the L-LTF 210, the L-SIG 212, and the HEW-SIGA1s 214. In other embodiments in which an OFDM data unit similar to the data unit 200 occupies a cumulative bandwidth other than 20 MHz, each of the L-STF 208, the L-LTF 210, the L-SIG 212, the HEW-SIGA1s 214 is repeated over a corresponding number of 20 MHz sub-bands of the whole bandwidth of the data unit, in an embodiment. For example, in an embodiment, the OFDM data unit occupies an 80 MHz bandwidth and, accordingly, includes four of each of the L-STF 208, the L-LTF 210, the L-SIG 212, the HEW-SIGA1s 214, in an embodiment. In some embodiments, the modulation of different 20 MHz sub-bands signals is rotated by different angles. For example, in one embodiment, a first subband is rotated 0-degrees, a second subband is rotated 90-degrees, a third sub-band is rotated 180-degrees, and a fourth sub-band is rotated 270-degrees. In other embodiments, different suitable rotations are utilized. The different phases of the 20 MHz sub-band signals result in reduced peak to average power ratio (PAPR) of OFDM symbols in the data unit 200, in at least some embodiments. In an embodiment, if the data unit that conforms to the first communication protocol is an OFDM data unit that occupies a cumulative bandwidth such as 20 MHz, 40 MHz, 80 MHz, 160 MHz, 320 MHz, 640 MHz, etc., the HEW-STF, the HEW-LTFs, the HEW-SIGB and the HEW data portion occupy the corresponding whole bandwidth of the data unit.

FIGS. 3A-3C are diagrams illustrating OFDM tone spacing used with OFDM symbols of a data unit, such as the data unit 200 of FIG. 2, in some embodiments. Turning first to FIG. 3A, the tone spacing 300 corresponds to tone spacing defined in a legacy communication protocol (e.g., the IEEE 802-11n Standard or the IEEE 802-11 ac Standard). For example, tone spacing 300 corresponds to the tone spacing defined in the IEEE 802.11a Standard, in an embodiment. In this embodiment, an OFDM symbol generated with the tone spacing 300 for a 20 MHz bandwidth is generated using a 64 point IFFT, resulting in the tone spacing (TS) of 312.5 kHz. Turning now to FIG. 3B, a tone spacing 320 is reduced by a factor of 2 (½) with respect to the tone spacing 300 of FIG. 3A. For example, continuing with the example above, whereas on OFDM symbol generated with the tone spacing 300 for a 20 MHz bandwidth is generated using a 64 point IFFT, an OFDM symbol generated with the tone spacing 320 for a 20 MHz bandwidth is generated using a 128 point IFFT, resulting in the ½ of the tone spacing 300 of FIG. 3A (i.e., 156.25 kHz). Similarly, turning now to FIG. 3C, a tone spacing 350 is reduced by a factor of 4 (¼) with respect to the tone spacing 300 of FIG. 3A. For example, continuing again with the example above, whereas an OFDM symbol generated with the tone spacing 300 for a 20 MHz bandwidth is generated using a 64 point IFFT, an OFDM symbol generated with the tone spacing 350 for a 20 MHz bandwidth is generated using a 256 point IFFT, resulting in the ¼ of the tone spacing 300 of FIG. 3A (i.e., 78.125 kHz), in an embodiment. A tone spacing defined in a legacy communication protocol, such as the tone spacing 400 of FIG. 3A, is sometimes referred to herein as "normal tone spacing" and a tone spacing that is smaller than the tone spacing defined by the legacy communication protocol, such as the tone spacing 320 of FIG. 3B and the tone spacing 350 of FIG. 3C is sometimes referred to herein as "reduced tone spacing."

Generally speaking symbol duration of an OFDM symbols, in time, is inversely proportional to the tone spacing used with the OFDM symbol. That is, if $\Delta f$ corresponds to the tone spacing used with an OFDM symbol, then the time symbol duration of the OFDM symbol is $T=1/\Delta f$. Accordingly, a relatively smaller tone spacing used with an OFDM symbol results in a relatively larger symbol duration of the OFDM symbol, and vice versa, in an embodiment. For example, a tone spacing of $\Delta f=312.5$ kHz as in FIG. 3A results in an OFDM symbol duration of 3.2 µs, while a tone spacing of $\Delta f=156.25$ kHz as in FIG. 3B results in an OFDM symbol duration of 6.4 µs, in an embodiment. Further, a sampling rate at which a receiving device needs to sample the OFDM symbol is inversely proportional to the IFFT size (number of points) used to generate the OFDM symbol. In particular, in an embodiment, if $N_{fft}$ is the IFFT size used to generate the OFDM symbol, then the sampling rate at which the receiving device needs to sample the OFDM symbol is $T/N_{fft}$, where T is the OFDM symbol duration ($T=1/\Delta f$).

Figure 4:
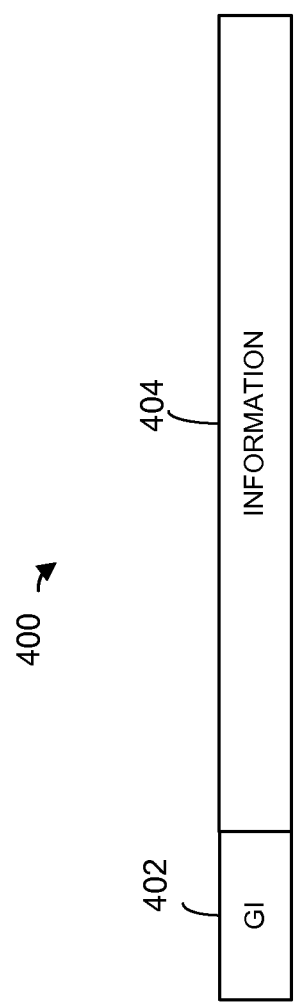
FIG. 4 is a diagram illustrating a guard interval used with an OFDM symbol of a data unit, according to an embodiment.

FIG. 4 is a diagram illustrating a guard interval used with an OFDM symbol of a data unit, such as the data unit 200 of FIG. 2, according to an embodiment. In an embodiment, a guard interval portion 402 is pre-pended to an information portion of the OFDM symbol 404. In an embodiment, the guard interval comprises a cyclic prefix repeating an end portion of the information portion 504. In an embodiment, the guard interval portion 402 is used to ensure orthogonality of OFDM tones at a receiving device (e.g., the client station 25-1) and to minimize or eliminate inter-symbol interference due to multi-path propagation in the communication channel via which the OFDM symbol is transmitted.

According to an embodiment, the length of the guard interval portion 502 to be used with particular OFDM symbols of the data unit 200 is selected from a set of guard intervals supported by the HEW communication protocol. For example, the set of guard intervals supported by the HEW communication protocol includes 0.4 µs, 0.8 µs, 1.6 µs, and 3.2 µs guard intervals. In other embodiments, the set of guard intervals supported by the HEW communication protocol exclude one or more of 0.4 µs, 0.8 µs, 1.6 µs, and 3.2 µs and/or include one or more suitable guard intervals other than 0.4 µs, 0.8 µs, 1.6 µs, and 3.2 µs instead of or in addition to the guard intervals 0.4 µs, 0.8 µs, 1.6 µs, and 3.2 µs. In an embodiment, in accordance with terminology used in a legacy communication protocol (e.g., the IEEE 802-11n Standard or the IEEE 802-11 ac Standard), a guard interval of 0.8 µs is sometimes referred to herein as a "normal guard interval" and a guard interval of 0.4 µs is sometimes referred to herein as "short guard interval."

In an embodiment, a first communication device (e.g., the AP 14 of FIG. 1) adaptively selects an OFDM numerology configuration to be used in communication with one or more second communication devices (e.g., one or more client stations 25) and/or dynamically selects an OFDM numerology configuration, among several adaptively selected OFDM numerology configurations, for transmission of a data unit to one or more second communication devices (e.g., one or more client stations 25). In an embodiment, the adaptively/dynamically selected OFDM numerology configuration is used for only a portion of a data unit transmitted from the first communication device to a second communication device. For example, referring to FIG. 2, OFDM symbols of a first portion of the data unit 200 utilize a predetermined OFDM numerology configuration while OFDM symbols of a second portion of the data unit 200 utilize an adaptively/dynamically selected OFDM numerology configuration, in an embodiment. In an embodiment, the predetermined OFDM numerology configuration corresponds to an OFDM numerology configuration conforming to a legacy communication protocol. For example, the predetermined OFDM numerology configuration conforms to the IEEE-802.11a Standard, the IEEE-802.11n Standard and/or the IEEE-802.11ac Standard, in an embodiment. The adaptively/dynamically selected OFDM numerology configuration, on the other hand, does not conform to the legacy communication protocol, in at least some embodiments and/or scenarios. For example, the adaptively selected OFDM numerology configuration includes a guard interval duration and/or a tone spacing that is different from the guard interval duration and/or the tone spacing that conforms to the legacy communication protocol. As just an example, OFDM symbols of the first portion of the data unit 200 utilize the normal tone spacing 300 of FIG. 3A, while at least some OFDM symbols of the second portion of the data unit 200 utilize the reduced tone spacing 320 of FIG. 3B or the reduced tone spacing 350 of FIG. 3C, in an embodiment. Additionally or alternatively, at least some OFDM symbols of the second portion of the data unit 200 utilize a guard interval that is longer than the longest guard interval that conforms to the legacy communication protocol (e.g., longer than 0.8 µs) or shorter than the shortest guard interval that conforms to the legacy communication protocol (e.g., shorter than 0.4 µs). In other embodiments and/or scenarios, however, OFDM symbols of the second portion of the data unit 200 are generated using the same OFDM numerology configuration as the OFDM symbols of the first portion of the data unit 200.

In an embodiment, the first communication device selects an OFDM numerology configuration to be used in communication with a second communication device based on one or more factors such as specifics of the communication channel (e.g., whether the communication channel is an indoor communication channel or an outdoor communication channel) between the first communication device and the second communication device, the maximum expected Doppler shift expected in the communication channel between the first communication device and the second communication device, capabilities of the second communication device, etc. In an embodiment, adaptively selecting an OFDM numerology configuration includes adaptively selecting a guard interval duration and/or a tone spacing to the used with at least some OFDM symbols of a data unit (or data units) communicated between the first communication device and the second communication device. Generally speaking, a relatively shorter guard interval and a relatively smaller tone spacing (resulting in a relatively longer OFDM symbol duration) reduces overhead and improves throughput in communication between the first communication device and the second communication device. However, a sufficiently long guard interval and/or sufficiently large tone spacing need to be used so as to achieve required or desired signal quality at the receiving communication device, in various embodiments and/or scenarios. Thus, for example, a sufficiently long guard interval is selected such that the guard interval is longer than the worst expected channel delay spread in the communication channel between the first communication device and the second communication device. Similarly, a sufficiently large tone spacing (and resulting sufficiently short OFDM symbol duration) is selected such that the communication channel between the first communication device and the second communication device remains sufficiently constant so as to maintain sufficient subcarrier orthogonality when the OFDM symbol is received by the receiving communication device, in an embodiment. Thus, a tone spacing is selected based at least in part on the worst expected Doppler spread of the communication channel between the first communication device and the second communication device. Further, a sufficiently large tone spacing is selected so as to maintain a sufficiently signal quality (e.g., carrier frequency offset, phase noise, etc.) at the receiving communication device according to receiver capabilities of the receiving communication device.

As discussed above, generally speaking, a guard interval duration is selected to be longer than the worst expected delay spread in the communication channel between the first communication device and the second communication device, in at least some embodiments and/or scenarios. Thus, for example, relatively longer guard intervals are selected for longer (larger coverage) communication channels characterized by generally longer channel delay spreads, such as outdoor communication channels, as compared to relatively shorter guard intervals selected for communication channels characterized by generally shorter channel delay spreads, such as indoor communication channels, in an embodiment. As also discussed above, a tone spacing is selected such that the resulting duration of the OFDM symbol is not too large relative to the rate of change of the communication channel, in some embodiments and/or scenarios. For example, a relatively smaller tone spacing (and the resulting relatively longer OFDM symbol durations) is selected for a slow varying communication channel, or a communication channel characterized by longer coherence time (such as a communication channel associated with a relatively slow moving communication device), as compared to a relatively larger tone spacing (and the resulting relatively shorter OFDM symbol duration) selected for a faster changing communication channel characterized by a relatively shorter coherence time (such as a communication channel associated with a relatively faster moving communication device), in an embodiment.

In some embodiments, the first communication device jointly selects a guard interval duration and a tone spacing so as to maintain a sufficiently low overhead and sufficiently high efficiency in communication between the first communication device and second communication device. For example, in an embodiment, the first communication device generally selects a relatively smaller tone spacing, resulting in a longer OFDM symbol duration, when a relatively longer guard interval is used, for example in case of an outdoor communication channel between the first communication device and the second communication device. Using a longer OFDM symbol duration, in effect, compensates for the longer guard interval, thereby maintaining the same efficiency and throughput as achieved with a shorter guard interval and a shorter OFDM symbols duration, in at least some embodiments and/or scenarios. In some embodiments, the first communication device selects a guard interval duration and/or a tone spacing such that the guard interval duration is a certain percentage, or a certain fraction, of the OFDM symbol duration resulting from the selected tone spacing. For example, a guard interval duration and/or a tone spacing is selected such that the guard interval is ¼ of the OFDM symbol, ⅛ of the OFDM symbol duration, ¹⁄₁₆ of the OFDM symbol duration, etc., or any other suitable fraction of the OFDM symbol duration, in various embodiments and/or scenarios.

In some embodiments, hardware capabilities of the receiving device or devices affect selection of the guard interval duration and/or tone spacing to be used in communication with the receiving device or devices. For example, some receiving devices are better able to handle impairments caused by signal propagation in the communication channel, allowing for relatively shorter guard intervals and/or relatively smaller tone spacing (and resulting longer OFDM symbol duration) to be used in communication with such receiving devices.

In an embodiment, adaptively selecting an OFDM numerology configuration includes adaptively selecting one or more of (i) a tone spacing, (ii) a guard interval duration and (ii) a beginning location for the adaptively selected tone spacing (iv) a beginning location of the adaptively selected guard interval duration. In some embodiments, one or more of (i) a tone spacing, (ii) a guard interval duration and (ii) a beginning location for the adaptively selected tone spacing (iv) a beginning location of the adaptively selected guard interval duration is/are predetermined (e.g., defined in the first communication protocol), and adaptively selecting OFDM numerology configuration includes adaptively selecting the other one or more of (i) a tone spacing, (ii) a guard interval duration and (ii) a beginning location for the adaptively selected tone spacing (iv) a beginning location of the adaptively selected guard interval duration. For example, in an embodiment, the first communication device selects a guard interval duration to be used with at least some OFDM symbols of the data unit 200, and the adaptively selected guard interval duration is used with at least some OFDM symbols of a portion of the data unit 200 beginning at a predetermined location within the data unit 200. As another example, the first communication device adaptively selects a guard interval duration and a starting location of the adaptively selected guard interval duration within the data unit 200, and the adaptively selected guard interval duration is used with at least some OFDM symbols of a portion of the data unit 200 beginning at the adaptively selected starting location within the data unit 200. As yet another example, the first communication device adaptively selects a tone spacing to be used with at least some OFDM symbols of the data unit 200, and the adaptively selected tone spacing is used with at least some OFDM symbols of a portion of the data unit 200 beginning at a predetermined location within the data unit 200. As another example, the first communication device adaptively selects a tone spacing and a starting location of the adaptively selected tone spacing within the data unit 200, and the adaptively selected guard interval duration is used with at least some OFDM symbols of a portion of the data unit 200 beginning at the adaptively selected starting location within the data unit 200. As yet another example, in yet another embodiment, the first communication device adaptively selects a guard interval duration and a tone spacing to be used with at least some OFDM symbols of the data unit 200, and the adaptively selected tone spacing and guard interval duration are used with at least some OFDM symbols in a portion (or in respective portions) of the data unit 200 beginning at a predetermined location (or at respective predetermined locations) within the data unit 200.

As yet another example, in another embodiment, the first communication device adaptively selects a guard interval duration, a tone spacing, and a starting location of the adaptively selected guard interval duration within the data unit 200. In this embodiment, the adaptively selected guard interval duration is used with at least some OFDM symbols in a portion of the data unit 200 beginning at the adaptively selected starting location within the data unit 200, while the adaptively selected tone spacing is used with at least some OFDM symbols in a portion of the data unit 200 beginning at a predetermined location within the data unit 200. As yet another example, in another embodiment, the first communication device adaptively selects a guard interval duration, a tone spacing, and a starting location of the adaptively selected tone spacing within the data unit 200. In this embodiment, the adaptively selected guard interval duration is used with at least some OFDM symbols in a portion of the data unit 200 beginning at a predetermined location within the data unit 200, while the adaptively selected tone spacing is used with at least some OFDM symbols in a portion of the data unit 200 beginning at the adaptively selected starting location within the data unit 200.

As still another example, in still another embodiment, the first communication device the first communication device adaptively selects a guard interval duration, a tone spacing, a starting location of the adaptively selected guard interval duration within the data unit 200, and a starting location of the adaptively selected tone spacing within the data unit 200. In this embodiment, the adaptively selected guard interval duration is used with at least some OFDM symbols in a portion of the data unit 200 beginning at the adaptively selected starting location of the selected guard interval duration within the data unit 200, and the adaptively selected tone spacing is used with at least some OFDM symbols in a portion of the data unit 200 beginning at the adaptively selected starting location of the selected tone spacing within the data unit 200. As yet another example, in yet another embodiment, the first communication device adaptively selects a guard interval duration, a tone spacing, and a staring location of the selected guard interval duration and tone spacing. In this embodiment, the adaptively selected guard interval duration and tone spacing are used with at least some OFDM symbols in a portion of the data unit 200 beginning at the adaptively selected starting location within the data unit 200.

In an embodiment, the first communication device additionally adaptively selects a beginning location of the second portion of the data unit (i.e., the location at which to start using the adaptively selected tone spacing and guard interval duration). For example, with continued reference to FIG. 2, the first communication device selects the first HEW-LTF 218-1 as the beginning location of the second portion at which to begin using the adaptively selected tone spacing and guard interval duration in the data unit 200. Accordingly, in this embodiment, the first tone spacing and guard interval (e.g., the normal tone spacing and the normal guard interval) are used with OFDM symbols of the legacy preamble portion 204, the HEW-SIGA field 214 and the HEW-STF field 216, and the adaptively selected tone spacing and guard interval are used with OFDM symbols of the HEW-LTF fields 218, the HEW-SIGB field 220 and the HEW data portion 222 of the data unit 200. As another example, in another embodiment, the first communication device selects the beginning of the HEW preamble portion 206 (i.e., the HEW-SIG-A1 field 214-1) as the beginning location of the second portion at which to start using the adaptively selected tone spacing and guard interval in the data unit 200. In this embodiment, the first tone spacing and guard interval (e.g., the normal tone spacing and the normal guard interval) are used with OFDM symbols of the legacy preamble portion 204, and the adaptively selected tone spacing and guard interval are used with the entire HEW preamble portion 206 and the data portion 222 of the data unit 200. As another example, in yet another embodiment, the first communication device selects the beginning of the HEW data portion 222 (i.e., the first OFDM symbol of the data portion 222) as the beginning location of the second portion at which to start using the adaptively selected tone spacing and guard interval in the data unit 200. In this embodiment, the first tone spacing and guard interval (e.g., the normal tone spacing and the normal guard interval) are used with OFDM symbols of the legacy preamble portion 204 and the HEW preamble portion 206, and the adaptively selected tone spacing and guard interval are used with OFDM symbols of the data portion 222 of the data unit 200. In other embodiments, other suitable locations within the data unit 200 are selected as beginning locations of the second portion in which to start using the adaptively selected tone spacing and guard interval in the data unit 200. Additionally, in some embodiments, the first tone spacing and guard interval are used with some OFDM symbols of the second portion of the data unit 200. For example, the normal tone spacing and guard interval, rather than the adaptively selected tone spacing and guard interval, are used with OFDM symbols of the padding portion 226 of the data portion 222, in some embodiments.

Figure 5A:
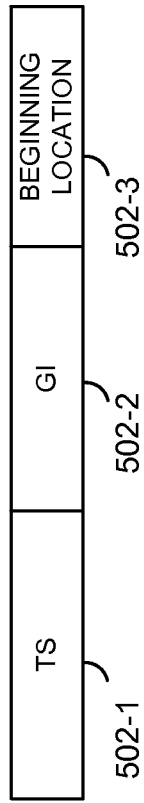
FIGS. 5A-5B are block diagrams illustrating example numerology indication fields, according to several embodiments.
Figure 5B:

In an embodiment, upon adaptively selecting OFDM numerology configuration to be used with the second communication device, the first communication device signals the selected OFDM numerology configuration to the second communication device. For example, in an embodiment, an indication of the adaptively selected OFDM numerology configuration is included in a preamble of a data unit transmitted from the first communication device to the second communication device. With reference to FIG. 2, in an embodiment, the HEW-SIGA field 214 or the HEW-SIGB field 220 includes one or more fields used to indicate the adaptively selected OFDM numerology configuration to the second communication device. FIGS. 5A-5B are block diagrams illustrating example numerology indication fields that are included in the HEW-SIGA field 214 or the HEW-SIGB field 220 of the data unit, according to some embodiments. Turning first to FIG. 5A, a numerology indication field 500 includes several sub-fields to independently signal different OFDM numerology configuration parameters adaptively selected for transmission of the data unit 200. In particular, the numerology indication field 500 includes a tone spacing (TS) subfield 502-1 to indicate the adaptively selected tone spacing for the data unit 200, a guard interval sub-field 502-2 to indicate the guard interval adaptively selected for the data unit 200, and a beginning location sub-field 502-3 to indicate the beginning location of the second portion at which the adaptively selected tone spacing indicated by the TS sub-field 502-1 and the adaptively selected guard interval indicated by the GI sub-field 502-2. In an embodiment, each of the TS sub-field 502-1 and the GI sub-field 502-2 includes two bits. In an embodiment, the values of the two bits of the TS sub-field 502-1 indicate one of four tone spacing options, symbol duration options or FFT size options. Similarly, the values of the two bits of the GI sub-field 502-2 indicate one or four guard interval options, in an embodiment. In other embodiments, the TS sub-field 502-1 and/or the GI sub-field 502-2 includes a suitable number of bits other than two bits (e.g., 1 bit, 3 bits, 4 bits, 5 bits, etc.). Additionally, in some embodiments, the TS sub-field 502-1 or the GI sub-field 502-2 is omitted from the numerology indication field 500. For example, the tone spacing used for the second portion of the data unit 200 is a pre-determined tone spacing, in an embodiment. In this embodiment, the TS sub-field 502-1 to indicate the tone spacing used for the second portion of the data unit 200 is not needed and is omitted from the numerology indication field 500. Similarly, the guard interval used for the second portion of the data unit 200 is a predetermined guard interval, in an embodiment. In this embodiment, the GI sub-field 502-1 to indicate the guard interval used for the second portion of the data unit 200 is not needed and is omitted from the numerology indication field 500.

In an embodiment, the beginning location sub-field 502-3 includes a single bit. The value of the single bit of the beginning location sub-field 502-3 indicates one of two options for beginning location of the second portion at which the adaptively selected tone spacing indicated by the TS sub-field 502-1 and the adaptively selected guard interval indicated by the GI sub-field 502-2. As just an example, a first value of the single bit of the beginning location sub-field 502-3 indicates that the tone spacing indicated by the TS sub-field 502-1 and the guard interval indicated by the GI sub-field 502-2 begins at the HEW data portion 222 of the data unit 200 (i.e., with the first OFDM symbol of the HEW data portion 222), and a second value of the single bit of the beginning location sub-field 502-3 indicates that the tone spacing indicated by the TS sub-field 502-1 and the guard interval indicated by the GI sub-field 502-2 begins at the first HEW-LTF field 218-1 of the data unit 200. In other embodiments, the beginning location sub-field 502-3 includes a number of bits other than one bit (e.g., 2 bits, 3 bits, etc.) In such embodiment, the beginning location sub-field 502-3 is capable of indicating more than two possible starting location options for the second portion of the data unit 200. In some embodiments, a single predetermined beginning location is defined as the beginning location of the second portion of the data unit 200 at which the adaptively selected tone spacing indicated by the TS sub-field 502-1 and the adaptively selected guard interval indicated by the GI sub-field 502-2 begins in the data unit 200. In such embodiments, the beginning location sub-field 502-3 to indicate the beginning location of the second portion of the data unit 200 is not needed and is omitted from the numerology indication field 500.

Turning now to FIG. 5B, a numerology indication field 550 includes a single field to indicate a selected combination of tone spacing, guard interval, and beginning location. The numerology indication field 550 includes two bits, in an embodiment. The values of the two bits indicate a selected one of four pre-defined combinations of the guard interval/tone spacing/beginning location used for the second portion of the data unit 200, in an embodiment. As just an example, a first value of the two bits (e.g., 00) indicates short guard interval/normal tone spacing/HEW-LTF field as the guard interval/tone spacing/beginning location used for the second portion of the data unit 200, a second value of the two bits (e.g., 01) indicates normal guard interval/normal tone spacing/HEW-LTF field as the guard interval/tone spacing/beginning location used for the second portion of the data unit 200, a third value of the two bits (e.g., 10) indicates long guard interval/normal tone spacing/HEW-LTF field as the guard interval/tone spacing/beginning location used for the second portion of the data unit 200, and a fourth value of the two bits (e.g., 00) indicates short guard interval/one quarter (¼) tone spacing/HEW-DATA portion as the guard interval/tone spacing/beginning location used for the second portion of the data unit 200. In other embodiments, the numerology indication field 550 includes a suitable number of bits other than two bits (e.g., 1 bit, 3 bits, 4 bits, 5 bits, etc.). In such embodiments, the numerology indication field 550 indicates a guard interval/tone spacing/beginning location combination selected from a corresponding number of predetermined guard interval/tone spacing/beginning location combination options other than four options (e.g., 1 option, 2 options, 3 options, 5 options, etc.). Further, in some embodiments, the numerology indication field 550 indicates a combination that excludes indication of one or more of the guard interval/tone spacing/beginning location. For example, one or more of the guard interval, tone spacing, and beginning location is pre-defined for the second portion of the data unit 200, in an embodiment. In this embodiment, the predetermined one or more of guard interval, tone spacing, and beginning location need not be indicated by the numerology indication field 550, and is excluded from indication by the numerology indication field 550.

In an embodiment, in addition to or instead of indicating adaptively selected OFDM numerology configuration in a preamble of a data unit such as the data unit 200, the AP 14 signals the selected OFDM numerology configuration in a management frame or a control frame transmitted by the AP 14. For example, in an embodiment, the AP 14 selects a particular OFDM numerology configuration to be used in the network 10, and broadcasts the selected OFDM numerology configuration in a management frame or a control frame to the client stations 25 in the network 10. In an embodiment, the AP 14 broadcasts the selected OFDM numerology configuration in a beacon frame. In other embodiments, the AP 14 signals the selected OFDM numerology configuration in a suitable management of control frame other than a beacon frame. Then, the AP 14 transmits data units, such as the data unit 200, to the client stations 25 using the selected OFDM numerology configuration signaled to the client stations 25 in the management frame or the control frame.

In some embodiments, the AP 14 adaptively selects more than one OFDM configuration that can be used in the network 10. For example, the AP 14 considers communication channels between the AP14 and multiple ones of the client stations 25 within the network 10 to select multiple OFDM configurations based on channel characteristics of the respective communication channels between the AP14 and multiple ones of the client stations 25 within the network 10, in an embodiment. In one such embodiment, the AP 14 then transmits a management frame or a control frame to the multiple client stations 25 to signal the several possible OFDM numerology configurations selected by the AP 14 for communication with the client stations 25. The AP 14 then dynamically selects a particular one of the multiple selected OFDM numerology configurations to be used with a particular client station 25 and/or a particular data unit to be transmitted to a particular client station 25, in an embodiment. The AP 14 signals the particular selected OFDM numerology configuration in a preamble of a data unit transmitted to the client station 25, in some such embodiment. For example, the AP 14 signals the particular selected OFDM numerology configuration in a signal field of the preamble, such as in the HEW-SIGA field 214 or the HEW-SIGB field 220 of the data unit 200. For example, the signal field (e.g., the HEW-SIGA field 214 or the HEW-SIGB field 220) includes a one bit indication to indicate whether a first selected OFDM numerology configuration is used in the data unit or a second selected OFDM numerology configuration is used in the data unit. As another example, in another embodiment, the signal field (e.g., the HEW-SIGA field 214 or the HEW-SIGB field 220) includes a two bit indication to indicate a particular one of three, or a particular one of one or four, selected OFDM configurations that is used in the data unit. The signal field includes other suitable numbers of bits used to signal a particular one of other numbers of multiple selected OFDM configurations, in other embodiments.

In another embodiment, a client station (e.g., the client station 25-1) negotiates with the AP 14 to agree on one or more OFDM numerology configurations that can be used in communication between the client station 25 and the AP 14. For example, the client station 25 signals, in a management or control frame transmitted to the AP 14, receiver capabilities of the client station 25, and the AP 14 selects one or more OFDM numerology configurations supported by the client station 25 according to the receiver capabilities signaled by the client station 25. In an embodiment, the management or control frame used by the client station 25 to signal receiver capabilities of the client station 25 is one of a probe frame, an association frame, or a re-association frame. In other embodiments, the management or control frame used by the client station 25 to signal receiver capabilities of the client station 25 is a suitable frame other than a probe frame, an association frame, or a re-association frame.

In an embodiment in which more than one OFDM numerology configuration are selected for use in the network 10, a particular one of the selected OFDM numerology configurations is selected for a data unit, or for multiple consecutive data units, communicated between the AP 14 and the client station 25. In this embodiment, a data unit transmitted from the AP 14 to the client station 25 (or transmitted from the client station 25 to the AP 14) includes an indication of the particular OFDM numerology configuration used for transmission of the data unit. For example, the signal field (e.g., the HEW-SIGA field 214 or the HEW-SIGB field 220) includes a one bit indication to indicate whether a first selected OFDM numerology configuration is used in the data unit or a second selected OFDM numerology configuration is used in the data unit. As another example, in another embodiment, the signal field (e.g., the HEW-SIGA field 214 or the HEW-SIGB field 220) includes a two bit indication to indicate a particular one of three, or a particular one of one or four, selected OFDM configurations that is used in the data unit.

In another embodiment in which the AP 14 selects several possible OFDM numerology configurations to be used in the network 10, or negotiates several possible OFDM numerology configurations with a client station 25 in the network 10, a particular one of the several possible OFDM numerology configuration selected for a data unit is not explicitly signaled in the data unit. In an embodiment in which a particular one of the several possible OFDM numerology configuration selected for a data unit is not explicitly signaled in the data unit, a receiving device of the data unit (e.g., a client station 25 or the AP 14) automatically detects which particular one of the several possible OFDM numerology configurations is used in the data unit. For example, in an embodiment, the receiving device tests hypothesis corresponding to each one of the several possible OFDM numerology configurations to determine which one of the tested hypothesis most likely corresponds to the particular OFDM numerology configuration used in the data unit. As just an example, in an embodiment, the AP 14 selects four possible combinations of guard interval and tone spacing that can be used in communication with a client station 25 (e.g., GI=0.8 µs/TS=normal tone spacing ($\Delta f$), GI=0.8 µs/TS=½$\Delta f$, GI=1.6 µs/TS=$\Delta f$, and GI=1.6 µs/TS=½ $\Delta f$). A receiving device (e.g., a client station 25) receiving a data unit performs respective cross correlations of the received signal using each of the four selected OFDM numerology configurations, in an embodiment. In particular, the receiving device performs cross-correlations using FFT size corresponding to the $\Delta f$ tone spacing, and cross-correlations using FFT size corresponding to the ½$\Delta f$ tone spacing, and using corresponding OFDM symbol durations as the cross-correlation interval for each of the tone spacing configurations, in an embodiment. Similarly, the receiving device performs cross-correlations using each of the possible guard interval durations (0.8 µs and 1.6 µs), and the corresponding cyclic prefix length, which determines the length of the cross-correlation, in an embodiment. The receiving device then selects the hypothesis (the tone spacing/guard interval combination) that resulted in the highest result of the corresponding cross-correlation as the OFDM numerology configuration used in the data unit, in an embodiment. Accordingly, the receiving device demodulates and decodes the data unit using the detected the OFDM numerology configuration used in the data unit, in an embodiment.

Figure 6:
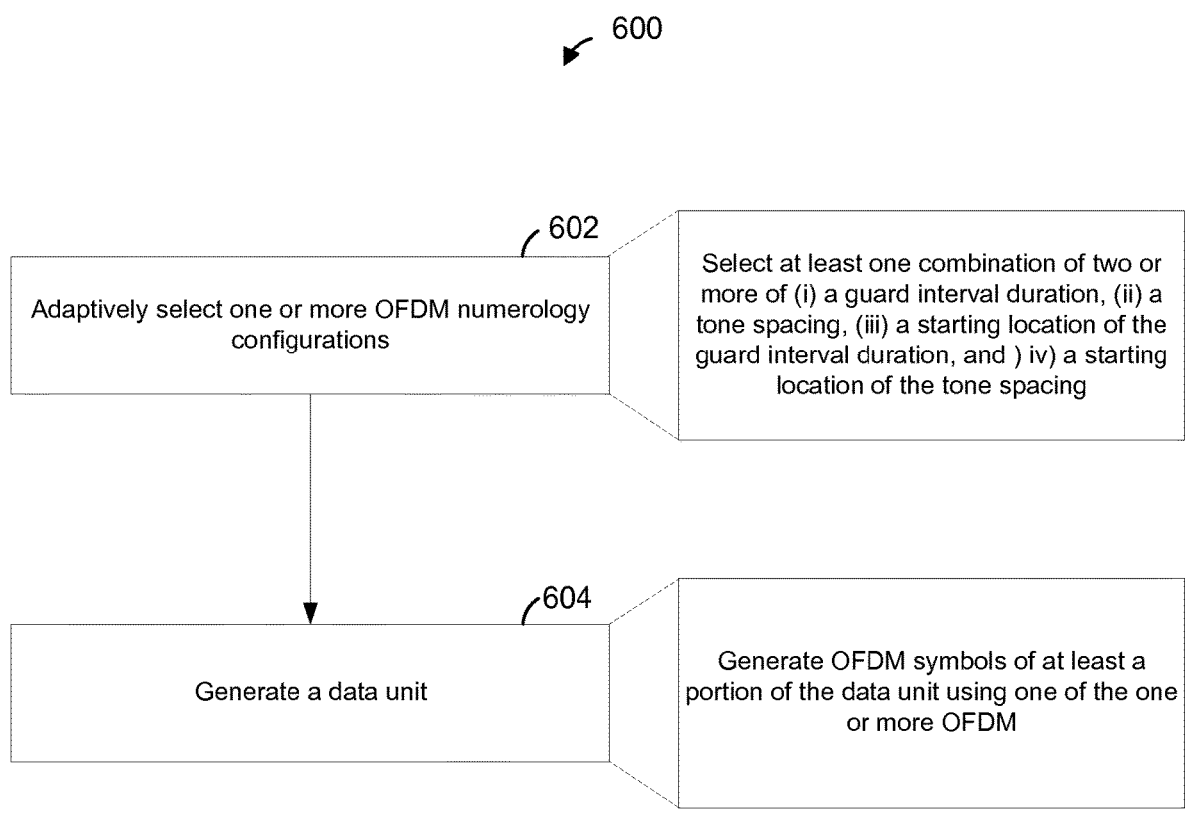
FIG. 6 is a flow diagram of an example method for adapting an OFDM numerology configuration for use in a communication network, according to an embodiment.

FIG. 6 is a flow diagram of an example method 600 for adapting an OFDM numerology configuration for use in a communication network, according to an embodiment. With reference to FIG. 1, the method 600 is implemented by the network interface device 16, in an embodiment. For example, in one such embodiment, the PHY processing unit 20 is configured to implement the method 600. According to another embodiment, the MAC processing 18 is also configured to implement at least a part of the method 600. With continued reference to FIG. 1, in yet another embodiment, the method 600 is implemented by the network interface device 27 (e.g., the PHY processing unit 29 and/or the MAC processing unit 28). In other embodiments, the method 600 is implemented by other suitable network interface devices.

At block 602, one or more OFDM numerology configurations are adaptively selected. In an embodiment, selecting the one or more OFDM configurations at block 602 includes selecting at least one combination of two or more of (i) a guard interval duration, (ii) a tone spacing, (iii) a starting location of the guard interval and (iv) a staring location of the tone spacing. In an embodiment, the one or more OFDM numerology configurations are adaptively selected to adapt to particular communication channel characteristics of the communication channel between a first communication device and a second communication device. For example, in an embodiment, the or more OFDM numerology configurations are selected based at least in part on (i) communication channel types of communication channels between the first communication device and the one or more second communication devices, (ii) maximum expected Doppler shifts expected in the communication channels between the first communication device and the one or more second communication devices, and (iii) receiver capabilities of the one or more second communication devices.

At block 604, a data unit is generated. In an embodiment, generating the data unit at block 604 includes generating OFDM symbols of at least a portion of the data unit using one of the one or more OFDM numerology configurations adaptively selected at block 602. In an embodiment, generating the OFDM data unit at block 604 further includes using a predetermined OFDM configuration to generate OFDM symbols of another portion of the data unit.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for adapting an orthogonal frequency division multiplexing (OFDM) numerology configuration for use in a communication network, wherein the OFDM numerology configuration corresponds to a plurality of OFDM parameters including a guard interval duration for OFDM symbols transmitted in the communication network, the method comprising:

adaptively selecting, at a first communication device, one or more OFDM numerology configurations to be used in communication with one or more second communication devices to improve one or both of (i) throughput and (ii) signal quality in the communication network, including adaptively selecting, (i) a guard interval duration and (ii) a starting location of an OFDM symbol utilizing the selected guard interval duration within a physical layer (PHY) data unit to be generated to improve one or both of (i) throughput and (ii) signal quality in the communication network, wherein the selected starting location of the OFDM symbol is selected from a plurality of starting locations within the PHY data unit to be generated, wherein the plurality of starting locations includes i) a first starting location that begins multiple OFDM symbols after a beginning OFDM symbol of the PHY data unit, and ii) a second starting location that begins multiple OFDM symbols after the beginning OFDM symbol of the PHY data unit, the second starting location different than the first starting location, and wherein:

in response to selecting either the first starting location or the second starting location, multiple first OFDM symbols of a non-legacy portion of the PHY data unit that are located after the selected starting location utilize the selected guard interval duration, the multiple first OFDM symbols including OFDM symbols within a data portion of the PHY data unit, multiple second OFDM symbols of a legacy portion of the PHY data unit that are located before the selected starting location utilize a different guard interval duration that is shorter than the selected guard interval duration, and multiple third OFDM symbols of the non-legacy portion of the PHY data unit that are located before the selected starting location utilize the different guard interval duration that is shorter than the selected guard interval duration;

generating, at the first communication device, the PHY data unit to be transmitted to a second communication device of the one or more second communication devices, including using one of the one or more adaptively selected OFDM numerology configurations to generate OFDM symbols of at least a portion of the PHY data unit; and transmitting, with the first communication device, the generated PHY data unit.

2. The method of claim 1, wherein adaptively selecting the one or more OFDM numerology configurations includes adaptively selecting the one or more OFDM numerology configurations based at least in part on one or more of:
    (i) communication channel types of communication channels between the first communication device and the one or more second communication devices;
    (ii) Doppler shifts in the communication channels between the first communication device and the one or more second communication devices; and
    (iii) receiver capabilities of the one or more second communication devices.

3. The method of claim 1, wherein the at least the portion of the PHY data unit is a first portion of the PHY data unit, and wherein generating the PHY data unit further comprises using a predetermined OFDM numerology configuration to generate OFDM symbols of a second portion of the PHY data unit, wherein the second portion of the PHY data unit is a portion other than the first portion of the PHY data unit.

4. The method of claim 1, further comprising:
    generating, at the first communication device, a numerology indication field to indicate the one of the one or more adaptively selected OFDM numerology configurations used in the at least the portion of the PHY data unit;
    generating, at the first communication device, a signal field of the PHY data unit to include the numerology indication field; and
    generating, at the first communication device, the PHY data unit to include the signal field in a preamble of the PHY data unit.

5. The method of claim 4, wherein generating the numerology indication field includes:
    generating respective indications of (i) the selected guard interval duration and (ii) the selected starting location of the OFDM symbol utilizing the selected guard interval duration; and
    generating the numerology indication field to include the respective indications.

6. The method of claim 4, wherein generating the numerology indication field includes:
    generating a joint indication of (i) the selected guard interval duration and (ii) the selected starting location of the OFDM symbol utilizing the selected guard interval duration; and
    generating the numerology indication field to include the joint indication.

7. The method of claim 1, wherein:
adaptively selecting the one or more OFDM numerology configurations comprises selecting only one OFDM numerology configuration; and
the method further comprises transmitting one of (i) a management frame or (ii) a control frame from the first communication device to the second communication device, wherein the one of (i) the management frame or (ii) the control frame includes an indication of the selected OFDM numerology configuration.

8. The method of claim 1, wherein:
adaptively selecting the one or more OFDM numerology configurations comprises selecting a plurality of OFDM numerology configurations; and
the method further comprises:
    transmitting one of (i) a management frame or (ii) a control frame from the first communication device to the second communication device, wherein the one of (i) the management frame or (ii) the control frame includes respective indications of each of the selected OFDM numerology configurations,
    dynamically selecting, at the first communication device, one of the plurality of OFDM numerology configurations to be used in the PHY data unit,
    generating, at the first communication device, an indication of the dynamically selected one of the plurality of OFDM numerology configurations,
    generating, at the first communication device, a signal field to include the indication of the dynamically selected one of the plurality of OFDM numerology configurations, and
    generating, at the first communication device, the PHY data unit to include the signal field in a preamble of the PHY data unit.

9. A first communication device comprising:
a network interface having one or more integrated circuit devices for adapting an OFDM numerology configuration for use in a communication network, wherein the OFDM numerology configuration corresponds to a plurality of OFDM parameters including a guard interval duration for OFDM symbols transmitted in the communication network, the network interface including:
    a medium access control (MAC) processing unit implemented on the one or more integrated circuit devices, and
    a physical layer (PHY) processing unit implemented on the one or more integrated circuit devices;

wherein the one or more integrated circuit devices are configured to:
adaptively select one or more OFDM numerology configurations to be used in communication with one or more second communication devices to improve one or both of (i) throughput and (ii) signal quality in the communication network, including adaptively selecting (i) a guard interval duration and (ii) a starting location of an OFDM symbol utilizing the selected guard interval duration within a physical layer (PHY) data unit to be generated to improve one or both of (i) throughput and (ii) signal quality in the communication network, wherein the selected starting location of the OFDM symbol is selected from a plurality of starting locations within the PHY data unit to be generated, wherein the plurality of starting locations includes i) a first starting location that begins multiple OFDM symbols after a beginning OFDM symbol of the PHY data unit, and ii) a second starting location that begins multiple OFDM symbols after the beginning OFDM symbol of the PHY data unit, the second starting location different than the first starting location, and wherein:
in response to the one or more integrated circuit devices selecting either the first starting location or the second starting location, multiple first OFDM symbols of a non-legacy portion of the PHY data unit that are located after the selected starting location utilize the selected guard interval duration, the multiple first OFDM symbols including OFDM symbols within a data portion of the PHY data unit, multiple second OFDM symbols of a legacy portion of the PHY data unit that are located before the selected starting location utilize a different guard interval duration that is shorter than the selected guard interval duration, and multiple third OFDM symbols of the non-legacy portion of the PHY data unit that are located before the selected starting location utilize the different guard interval duration that is shorter than the selected guard interval duration;
wherein the one or more integrated circuit devices are further configured to:
generate the PHY data unit to be transmitted to a second communication device of the one or more second communication devices, including using one of the one or more adaptively selected OFDM numerology configurations to generate OFDM symbols of at least a portion of the PHY data unit; and
wherein the PHY processing unit includes one or more transceivers configured to transmit the generated PHY data unit.

10. The first communication device of claim 9, wherein the one or more integrated circuit devices are configured to adaptively select the one or more OFDM numerology configurations based at least in part on one or more of:
(i) communication channel types of communication channels between the first communication device and the one or more second communication devices;
(ii) Doppler shifts in the communication channels between the first communication device and the one or more second communication devices; and
(iii) receiver capabilities of the one or more second communication devices.

11. The first communication device of claim 9, wherein the at least the portion of the PHY data unit is a first portion of the PHY data unit, and wherein the one or more integrated circuit devices are configured to use a predetermined OFDM numerology configuration to generate OFDM symbols of a second portion of the PHY data unit, wherein the second portion of the PHY data unit is a portion other than the first portion of the PHY data unit.

12. The first communication device of claim 9, wherein the one or more integrated circuit devices are configured to:
generate a numerology indication field to indicate the one of the one or more adaptively selected OFDM numerology configurations used in the at least the portion of the PHY data unit;
generate a signal field of the PHY data unit to include the numerology indication field; and
generate the PHY data unit to include the signal field in a preamble of the PHY data unit.

13. The first communication device of claim 12, wherein the one or more integrated circuit devices are configured to:
generate respective indications of (i) the selected guard interval duration and (ii) the selected starting location of the OFDM symbol utilizing the selected guard interval duration; and
generate the numerology indication field to include the respective indications.

14. The first communication device of claim 12, wherein the one or more integrated circuit devices are configured to:
generate a joint indication of (i) the selected guard interval duration and (ii) the selected starting location of the OFDM symbol utilizing the selected guard interval duration; and
generate the numerology indication field to include the joint indication.

15. The first communication device of claim 9, wherein adaptively selecting the one or more OFDM numerology configurations comprises selecting only one OFDM numerology configuration, and wherein the one or more integrated circuit devices are further configured to transmit one of (i) a management frame or (ii) a control frame from the first communication device to the second communication device, wherein the one of (i) the management frame or (ii) the control frame includes an indication of the selected OFDM numerology configuration.

16. The first communication device of claim 9, wherein adaptively selecting the one or more OFDM numerology configurations comprises selecting a plurality of OFDM numerology configurations, and wherein the one or more integrated circuit devices are further configured to:
control the one or more transceivers to transmit one of (i) a management frame or (ii) a control frame from the first communication device to the second communication device, wherein the one of (i) the management frame or (ii) the control frame includes respective indications of each of the selected OFDM numerology configurations;
dynamically select one of the plurality of OFDM numerology configurations to be used in the PHY data unit;
generate an indication of the dynamically selected one of the plurality of OFDM numerology configurations;
generate a signal field to include the indication of the dynamically selected one of the plurality of OFDM numerology configurations; and
generate the PHY data unit to include the signal field in a preamble of the PHY data unit.

17. The method of claim 1, further comprising:
adaptively selecting, at the first communication device, a tone spacing for OFDM symbols of at least the portion of the PHY data unit;

wherein generating the PHY data unit includes generating OFDM symbols of at least the portion of the PHY data unit having the adaptively selected tone spacing.

18. The method of claim 17, further comprising:

generating, at the first communication device, an indication of the selected guard interval duration to indicate the selected guard interval duration relative to an OFDM symbol duration corresponding to the selected tone spacing; and generating, at the first communication device, a signal field of the PHY data unit to include the indication of the selected guard interval duration;

wherein generating the PHY data unit includes generating the PHY data unit to include the signal field in a preamble of the PHY data unit.

19. The first communication device of claim 9, wherein the one or more integrated circuit devices are further configured to:

adaptively select a tone spacing for OFDM symbols of at least the portion of the PHY data unit; and generate OFDM symbols of at least the portion of the PHY data unit having the adaptively selected tone spacing.

20. The first communication device of claim 19, wherein the one or more integrated circuit devices are further configured to:

generate an indication of the selected guard interval duration to indicate the selected guard interval duration relative to an OFDM symbol duration corresponding to the selected tone spacing;

generate a signal field of the PHY data unit to include the indication of the selected guard interval duration; and generate the PHY data unit to include the signal field in a preamble of the PHY data unit.

21. The method of claim 1, wherein:

the PHY data unit includes a PHY preamble and a PHY data portion that follows the PHY preamble;

the PHY preamble includes a plurality of long training fields (LTFs); and the plurality of starting locations includes (i) a beginning OFDM symbol of the plurality of LTFs, and (ii) a beginning OFDM symbol of the PHY data portion.

22. The first communication device of claim 9, wherein:

the PHY data unit includes a PHY preamble and a PHY data portion that follows the PHY preamble;

the PHY preamble includes a plurality of long training fields (LTFs); and the plurality of starting locations includes (i) a beginning OFDM symbol of the plurality of LTFs, and (ii) a beginning OFDM symbol of the PHY data portion.

* * * * *